United States Patent [19]

Hisatani et al.

[11] Patent Number: 5,162,476
[45] Date of Patent: Nov. 10, 1992

[54] STEREOREGULAR ACRYLONITRILE POLYMER AND COMPOSITION COMPRISING SAME

[75] Inventors: Kunio Hisatani, Ikeda; Hitoshi Yamazaki, Ibaraki, both of Japan

[73] Assignee: Asahi Kasei Kogyo Kabushiki Kaisha, Osaka, Japan

[21] Appl. No.: 807,955

[22] Filed: Dec. 10, 1991

Related U.S. Application Data

[63] Continuation of Ser. No. 688,384, Apr. 22, 1991, abandoned, which is a continuation of Ser. No. 517,713, May 2, 1990, abandoned.

[30] Foreign Application Priority Data

May 6, 1989 [JP] Japan ................................. 1-112815

[51] Int. Cl.$^5$ ............................................. C08F 120/44
[52] U.S. Cl. ..................................... 526/341; 526/183; 526/177; 526/169.3; 526/123
[58] Field of Search .......................................... 526/341

[56] References Cited

U.S. PATENT DOCUMENTS

| | | | |
|---|---|---|---|
| 3,117,111 | 1/1964 | Natta | 526/341 X |
| 3,231,552 | 1/1966 | Natta | 526/341 X |
| 3,246,772 | 3/1966 | Natta | 526/341 X |

FOREIGN PATENT DOCUMENTS 63-304029 12/1988 Japan .
1-203406 8/1989 Japan .

OTHER PUBLICATIONS

M. Minagawa et al., (1989) Macromolecules 22, 2054–2058.
M. Minagawa et al., (1988) Macromolecules 21, 2387–2391.
Chem. Abstracts 110: 214678r.
Chem. Abstracts 112: 140098u.

Primary Examiner—Joseph L. Schofer
Assistant Examiner—M. Nagumo
Attorney, Agent, or Firm—Finnegan, Henderson, Farabow, Garrett, Dunner

[57] ABSTRACT

Disclosed is a linear acrylonitrile polymer having a viscosity average molecular weight of at least 50,000, which has a stereoregularity such that the polymer satisfies requirements of $I > 0.4$ and $(I + 3S) > 0.95$, wherein I represents the fraction of the isotactic triad and S represents the fraction of the syndiotactic triad. A shaped article is made from a composition comprised of the linear acrylonitrile polymer and a solvent or plasticizer which is selected from a protonic acid and an aqueous solution thereof, an aqueous inorganic salt solution, and a mixture of an organic solvent and an inorganic salt. The fiber made therefrom has an enhanced drawability.

2 Claims, 3 Drawing Sheets

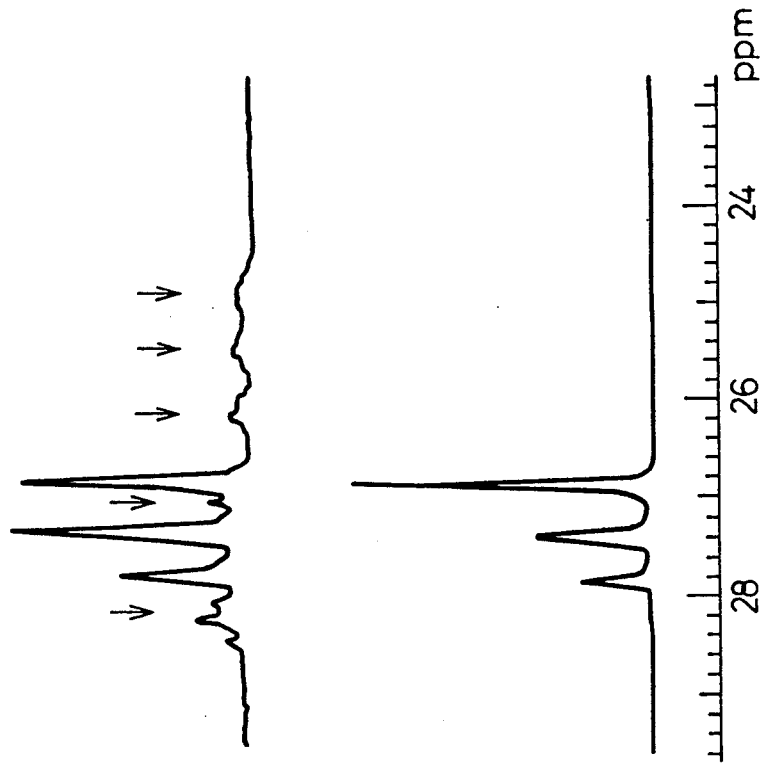
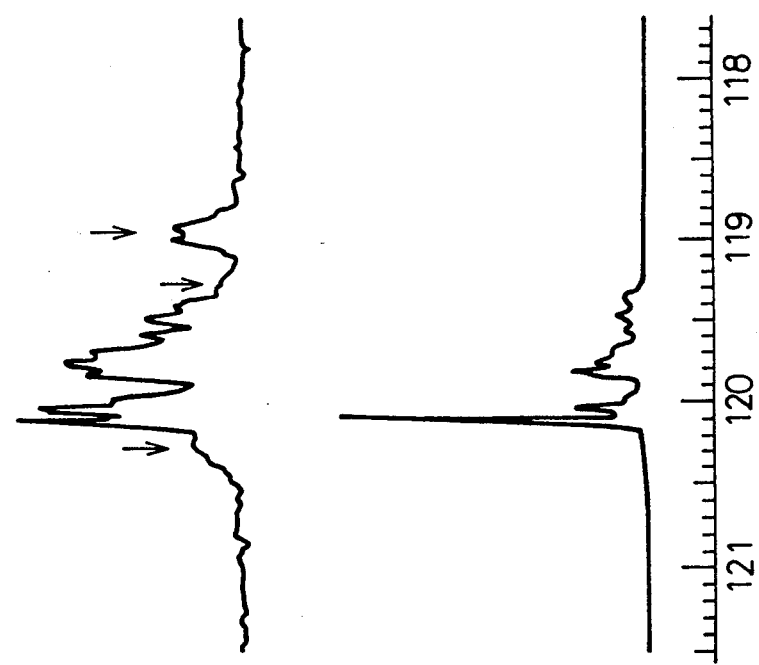
Fig.2a
Fig.2b

STEREOREGULAR ACRYLONITRILE POLYMER AND COMPOSITION COMPRISING SAME

This application is a continuation of application Ser. No. 07/688,384 filed Apr. 22, 1991 (now abandoned) which is in turn a continuation application of Ser. No. 07/517,713 filed May 2, 1990 (now abandoned).

BACKGROUND OF THE INVENTION

1. Field of the Invention

This invention relates to a stereoregular acrylonitrile polymer having a superior shapeability in the formation of a fiber or film, and a composition comprising this polymer.

This stereoregular acrylonitrile polymer is useful for a fibrous material having a high mechanical strength and a superior heat resistance in the wet state, a material for the selective adsorption of metals, an electroconductive polymer, and a starting material for the production of a high-tenacity carbon fiber.

2. Description of the Related Art

An acrylonitrile polymer shows a good bulkiness, touch and heat-insulating property when shaped into a fiber, and if the acrylonitrile polymer is a copolymer, the fiber can be dyed in a sharp color and the dyed product has a good weatherability. Accordingly, the acrylonitrile polymer is widely used for articles of clothing.

This acrylonitrile polymer is generally prepared by polymerizing acrylonitrile by using a radical polymerization initiator or an anion polymerization initiator, in the acrylonitrile polymer obtained according to this process, there is no regularity of the chemical structure when measured by the nuclear magnetic resonance (hereinafter referred to as "NMR") analysis. When this polymer is dissolved in a solvent and shaped into a fiber or a film, the mechanical characteristics are not satisfactory because the crystallinity is low, and moreover, the fiber or film has a poor heat resistance, especially the heat resistance in the wet state. Especially when the acrylonitrile polymer is shaped into a fiber, since the dimensional stability, tensile strength and elastic modulus are poor, the development of high-grade articles of clothing is limited and the application to usual industrial materials or space industrial materials is similarly limited.

It is known that, if a urea-acrylonitrile inclusion compound is irradiated with actinic rays such as γ-rays, an acrylonitrile polymer having a stereoregularity, i.e., a highly stereoregular acrylonitrile polymer, is obtained. An acrylonitrile polymer having an isotactic triad fraction I (described hereinafter) of at least 0.4, which is obtained according to this process, is found to show an increased melting point in the presence of water. Furthermore, a fiber of this acrylonitrile polymer is characterized in that the Young's modulus in hot water is much higher than that of the conventional polyacrylonitrile fiber, and the heat resistance in the wet state is improved. Furthermore, if a metal salt such as copper sulfate is added to a solution of this acrylonitrile polymer, the metal ion coordinates selectively at the meso position to the cyano group of the acrylonitrile polymer molecule [Polymer Journal, Vol. 18, page 277 (1986)], and therefore, the acrylonitrile polymer is suitable as a selective adsorption material for a metal or a starting material for the production of an electroconductive polymer. Moreover, since the acrylonitrile polymer has a high crystallinity, it is considered that the acrylonitrile polymer can be used as a starting material for the production of a carbon fiber having a high tenacity.

In the above-mentioned process for preparing a highly stereoregular acrylonitrile polymer by irradiating a urea-acrylonitrile inclusion compound with γ-rays (hereinafter referred to as "γ-ray process"), a high isotactic triad fraction I of from about 0.4 to about 0.8 is obtained, and the above-mentioned characteristic properties are obtained. When this polymer is shaped into a film or a fiber, however, since the shapeability characteristics, especially the drawability, are poor, a film or fiber having a required high performance is difficult to obtain.

SUMMARY OF THE INVENTION

An object of the present invention is to improve the shapeability of the conventional, highly stereoregular acrylonitrile polymer described above and provide a highly isotactic acrylonitrile polymer having a good drawability or a composition comprising the same.

The inventors investigated the catalytic polymerization of acrylonitrile, independently of the above-mentioned γ-ray process, and conducted experiments where acrylonitrile was polymerized at a temperature higher than the boiling point (77° C.) of acrylonitrile under atmospheric pressure. As a result, it was surprisingly found that, under such particular conditions, an acrylonitrile polymer having an isotactic fraction higher than 0.4 is obtained, and that if a polymer composition comprised of this acrylonitrile polymer and an appropriate solvent or plasticizer is spun into a fiber or shaped into a film, an acrylonitrile polymer having good shapeability characteristics such as a good drawability can be obtained (see Japanese Unexamined Patent Publication No. H1-203406).

The inventors examined in detail the differences of the physical properties of the stereoregular acrylonitrile polymer obtained according to the conventional γ-ray process and the stereoregular acrylonitrile polymer obtained according to the above-mentioned catalyst process, and as a result, found that in an acrylonitrile polymer having superior shapeability characteristics, such as drawability, the relationship $(I+3S)>0.95$ is established between the triad fractions I and S (described hereinafter). Furthermore, it was found that, in the stereoregular acrylonitrile polymer obtained by the γ-ray process, the relationship $(I+3S)<0.95$ is established, and that the stereoregular acrylonitrile polymer obtained by the γ-ray process is different from the polymer obtained by the catalytic process in the region of triad fractions I and S.

In accordance with the present invention, there is provided a linear acrylonitrile polymer having a viscosity average molecular weight of at least 50,000, which has a stereoregularity such that the polymer satisfies requirements of $I>0.4$ and $(I+3S)>0.95$, wherein I represents the fraction of the isotactic triad and S represents the fraction of the syndiotactic triad.

The stereoregular acrylonitrile copolymer of the present invention is used for the shaping operation in the form of a composition comprising a protonic acid defined below or an aqueous solution thereof, an aqueous solution of an inorganic salt, or a mixture of an organic solvent and an inorganic salt, as a solvent or plasticizer.

BRIEF DESCRIPTION OF THE DRAWINGS

FIG. 2 is a $^{13}$C-NMR chart, in which FIG. 2-(a) shows absorption peaks of a polymer having a viscosity average molecular weight of 5,000 and FIG. 2-(b) shows absorption peaks of a polymer having a viscosity average molecular weight of 88,000; and, FIG. 3 shows an example of the polymerization apparatus for use in the production of a stereoregular acrylonitrile polymer.

DESCRIPTION OF THE PREFERRED EMBODIMENTS

An acrylonitrile polymer having a (I+3S) larger than 0.95, as in the present invention, has not been seriously studied, and only a process in which acrylonitrile is polymerized by using a complex of an alkoxide with an alkali metal amide compound as the polymerization initiator in a polar or nonpolar solvent is known [European Polymer Journal, Volume 22, page 559 (1986)]. Nevertheless, although the (I+3S) of the obtained acrylonitrile polymer is larger than 0.95, the value I is as small as 0.2 to 0.4 and the acrylonitrile polymer does not possess the superior characteristics possessed by the stereoregular acrylonitrile polymer, such as a high mechanical strength and a high heat resistance in the wet state.

The reason why the shapeability changes at the boundary of the value (I+3S) has not been completely elucidated, but it is considered that the above-mentioned phenomenon is related to the fact that, in the triangular coordinate diagram (FIG. 1) expressing the triad fractions I, H and S (described hereinafter) of the stereoregular polymer, the straight line qi connecting the point i of a complete isotacticity and the point q of a complete absence of the stereoregularity is represented by the equation $I+3S=1$.

Figure 1:
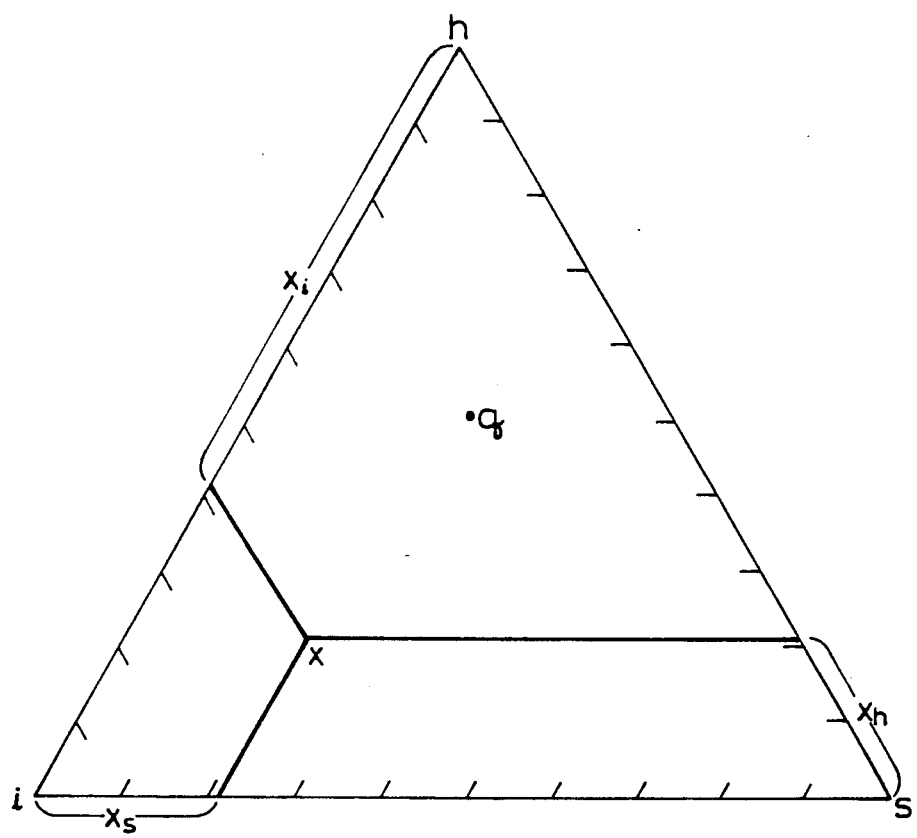
FIG. 1 is a triangular coordinate diagram showing triad fractions I, H and S of a stereoregular acrylonitrile polymer.
Figure 4:
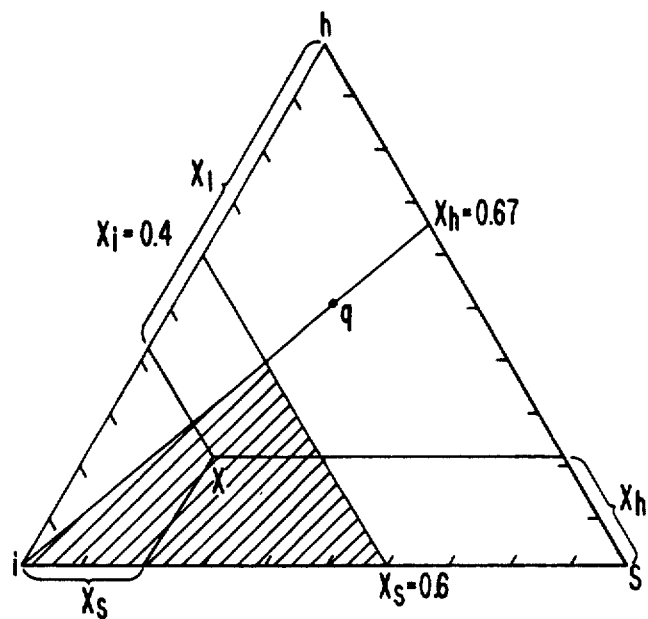
FIG. 4 is a triangular coordinate diagram showing triad functions of I, H and S of a stereoregular acrylonitrile polymer in which $X_i=0.4$, $X_h=0.67$ and $X_s=0.6$.

FIG. 1 will now be briefly described. In FIG. 1, i is the point of a complete isotacticity, s is the point of a complete syndiotacticity, and h is the limiting point of the heterotacticity. Furthermore, q is the point at which the stereoregularity is completely absent and the configuration is completely random. Moreover, x is an optional point in the triangular coordinate diagram, and the amplitudes of I (isotactic triad fraction mm), H (heterotactic triad fraction mr), and S (syndiotactic triad fraction rr) corresponding to this point x are lengths expressed by xi, xh, and xs, respectively. In FIG. 4, $X_i=0.4$, $X_h=0.67$ and $X_s=0.6$ thereby providing area X defined by the specific values for the isotacticity i, the syndiotacticity s and the heterotacticity h as set forth therein.

The isotactic triad fraction I referred to herein is one of the triad fractions, and is calculated from the peak intensity of carbon of the cyano group in $^{13}$C-NMR (nuclear magnetic resonance measurement apparatus using carbon isotope having a mass number of 13) of a solution of the polymer in deuterated dimethylsulfoxide. More specifically, the triad fraction I is determined by identifying the peak based on the pentad tacticity attributed by the method of Kamide et al described in the Polymer Journal, Volume 17, page 1291 (1985). In the peak resolution chart based on the stereoregularity of the nuclear magnetic resonance absorption of $^{13}$C-NMR, the ratio of the sum of the intensities of the three peaks mmmm, mmmr and rmmr to the total peak intensity is the isotactic fraction.

Similarly, the heterotactic triad fraction H is defined as the ratio of the sum of the intensities of the four peaks mmrm, mmrr, rmrm and rmrr, and the syndiotactic triad fraction S is defined as the ratio of the sum of the intensities of the three peaks mrrm, mrrr and rrrr. Accordingly, the relationship represented by the equation $I+H+S=1$ is established.

At this measurement, to increase the resolving power and obtain a good determining property, only the region of the absorption peak of the carbon atom in the cyano group (119 to 121 ppm; based on tetramethylsilane) is noted, and the range of from 500 Hz smaller than this peak to 500 Hz larger than this peak is observed. Fourier transformation NMR (FX-200 supplied by JEOL) is used as the apparatus and deuterated dimethylsulfoxide is used as the solvent, and the sample concentration is adjusted to 3 to 20% by weight. As the measurement conditions, there are adopted a temperature of 80° C., an observation frequency range of 1,000 Hz, a data point of 16 k, an irradiation time of 6.5 μs (45° pulse), a pulse delay time of 2.5 s, a sampling time of 8.1 s, and an integration frequency of from 64×10 to 64×100.

To obtain a satisfactory fiber or film, the stereoregular acrylonitrile polymer must have a linear molecule and a viscosity average molecular weight of at least 50,000.

The stereoregular acrylonitrile polymer of the present invention includes not only an acrylonitrile homopolymer but also a copolymer comprising at least 50% by weight of acrylonitrile units. As the monomer to be copolymerized with acrylonitrile, there can be mentioned ethylenically unsaturated monomers, for example, methyl acrylate, methyl methacrylate, methacrylonitrile, vinyl acetate and vinylidene chloride.

The stereoregular acrylonitrile polymer of the present invention is prepared according to a process in which the polymerization is carried out by using an organometallic as described below as the initiator.

More specifically, there can be used organometallic compounds containing an alkaline earth metal, organometallic compounds, i.e., "art complexes", which comprise at least two metals selected from the group consisting of metals of groups I, II and III of the Periodic Table in combination, and Ziegler-Natta initiators comprising an organometallic compound containing an alkaline earth metal and a transition metal compound.

Examples of the organometallic compound that can be used as an appropriate initiator will now be described, but the polymer of the present invention is by no means limited by these examples.

As the organometallic compound containing an alkaline earth metal, there can be used organic metal compounds containing beryllium, magnesium, calcium, strontium or barium. As the organic beryllium compound, there can be mentioned compounds represented by the formula $R_2Be$, such as diethylberyllium, n-propylberyllium, and n-butylethylberyllium, and Grignard type compounds represented by RBeX, such as phenylberyllium chloride and allylberyllium bromide. As the calcium compound, there can be mentioned compounds represented by the formula $R_2Ca$, such as diphenylcalcium and phenylethylcalcium, and compounds represented by RCaX, such as ethylcalcium bromide and n-butylcalcium iodide. As the barium compound, there can be mentioned di-n-propylbarium.

As the organic magnesium compound, there can be mentioned organic compounds represented by the formula $R_2Mg$ (in which R represents an aliphatic or aromatic hydrocarbon group or a combination thereof), for example, organic magnesium compounds having two of the same hydrocarbon groups, such as dimethylmagnesium, diethylmagnesium, di-n-propylmagnesium, di-n-butylmagnesium, diisoamylmagnesium, di-n-hexylmagnesium, diallylmagnesium, and diphenylmagnesium, and organic magnesium compounds having two different hydrocarbon groups, such as methylethylmagnesium, n-butylethylmagnesium and phenylethylmagnesium. Furthermore, a Grignard reagent RMgX (in which R is as defined above and X represents a halogen atom) is effective as the initiator. For example, there can be mentioned ethylmagnesium chloride, n-butylmagnesium bromide, phenylmagnesium iodide, and benzylmagnesium fluoride.

Still further, organic magnesium compounds formed by substituting alkyl groups in the foregoing organic magnesium compounds with a substituent such as an amine group, an alkoxy group, an alkylsilyl group, an alkylthio group or a combination thereof have a higher effect. For example, there can be mentioned compounds represented by the formula $R_2NMgR$, such as ethyldiethylaminomagnesium, compounds represented by the formula $R_2NMgNR_2$, such as bis(diethylamino)magnesium and bis(diphenylamino)magnesium (in these two formulae, R is as defined above, but two R's represented as $R_2$ can be bonded to each other to form a heterocyclic ring together with the nitrogen atom to which they are bonded), compounds represented by the formula ROMgR (R is as defined above), such as methoxyethylmagnesium, compounds represented by the formula ROMgOR (R is as defined above), such as dimethoxymagnesium, diethoxymagnesium, and di-n-butoxymagnesium, compounds represented by the formula $R_3SiMgSiR_3$ (R is as defined above), such as bis(trimethylsilyl)magnesium, compounds represented by the formula $R_3SiMgR$ (R is as defined above), such as trimethylsilylethylmagnesium, compounds represented by the formula RSMgR (R is as defined above), such as methylthioethylmagnesium, compounds represented by the formula RSMgSR (R is as defined above), such as bis(methylthio)magnesium, compounds represented by the formula $(R_3Si)_2NMgN(SiR_3)_2$, such as bis[bis(trimethylsilylamino)]magnesium, and compounds represented by the formula $(R_3Si)_2NMgR$ (R in the last two formulae is as defined above).

A transition metal compound can be combined with an organometallic compound as described above. The transition metal is a part of the starting material of a polymerization initiator, i.e., a Ziegler-Natta catalyst. Various transition metal compounds can be used. For example, there can be mentioned titanium compounds represented by dichlorotitanium, trichlorotitanium, tetrachlorotitanium, tetra-n-propoxytitanium, tetrahydroxytitanium, and dicyclopentadienyldichlorotitanium, vanadium compounds such as trichlorovanadium, tetrachlorovanadium, vanadium oxytrichloride, and acetylacetone vanadium, and trichlorochromium.

As the art complex comprising at least two metals selected from metals of groups I, II and III of the Periodic Table, there can be mentioned general forms represented by formulae $M^1M^2R_{3-n}H_n$, $M^1AlR_{4-n}H_n$, $M^2AlR_{5-n}X_n$, $M^2(AlR_{4-n}H_n)_2$, $M^2AlR_{5-n}(NR_2)_n$, $LiZnR_{3-n}(NR_2)_n$ and $Li_2ZnR_{4-n}(NR_2)_n$.

In the foregoing formulae, R's may be the same or different and represent an aliphatic hydrocarbon, an aromatic hydrocarbon, or a combination thereof, $M^1$ is a metal selected from lithium, sodium and potassium, $M^2$ is a metal selected from magnesium, beryllium, calcium, zinc and cadmium, X is an element selected from fluorine, chlorine, bromine or iodine, and n is zero or a positive integer and is selected so that the value of the suffix $(5-n)$, $(4-n)$ or $(3-n)$ in each molecule is not a negative value.

As specific examples, there can be mentioned triethylsodium magnesium, bis(tetraethylaluminum) magnesium, diphenylaminotetraethylmagnesium aluminum, diphenylaminodiethylzinc lithium, and di-n-butyldiethylzinc dilithium.

The polymerization conditions will now be described. The polymerization temperature must be at least 110° C. If the polymerization is carried out at a temperature lower than the boiling point (77° C.) of acrylonitrile under atmospheric pressure, the condition of $I>0.4$ is not satisfied and the viscosity average molecular weight is lower than 50,000. This means that the substantial molecular weight is low, or even if the substantial molecular weight is not low, the branched structure in the polymer chain is increased and the polymer chain is not linear. Furthermore, the yellowing of the polymer is conspicuous. When the polymerization is carried out at a temperature higher than 77° C. but lower than 110° C., the conditions $I>0.4$ and $(I+3S)>0.95$ are satisfied but the viscosity average molecular weight is lower than 50,000.

FIG. 2 shows NMR charts of two polymers, one of which has a viscosity average molecular weight 5,000 and has been obtained at a polymerization temperature of 85° C. [FIG. 2-(a)] and the other of which has a viscosity average molecular weight of 99,000 and has been obtained at a polymerization temperature of 130° C. [FIG. 2-(b)]. The number of absorption peaks in the charts of FIG. 2-(a) is larger than in the charts of FIG. 2-(b) (i e., the peaks indicated by arrows are found in FIG. 2-(a), but not found in FIG. 2-(b)), and many peaks considered to be attributed to terminals and branches of the molecule are observed in the low-molecular-weight polymer [see the thesis concerning branching of polyacrylonitrile; W. Berger et al, Acta Polymerica, 33, 626 and 632 (1982)], In this case, the spinnability and drawability are extremely poor, and the physical properties after the shaping are bad.

It is known that PAN is usually decomposed and decolored at a temperature slightly lower than 200° C., and as regards the upper limit of the polymerization temperature, it is practically preferred that the polymerization is carried out at a temperature lower than the temperature causing decomposition and decolorization.

As the polymerization solvent, solvents not inhibiting the polymerizing capacity of the above-mentioned initiator can be optionally selected from various organic solvents. Organic solvents having an aromatic hydrocarbon group in the molecule thereof are preferably used. The mechanism of polymerization using such a solvent has not been completely elucidated, but it is considered that $\pi$-electrons of the aromatic hydrocarbon group in the solvent molecule play an important role in the stereoregularity of the acrylonitrile polymer. The kind of solvent used is not particularly critical, but there can be mentioned benzene, toluene, o-xylene, m-xylene, p-xylene, naphthalene, diphenyl ether, and biphenyl.

As the solvent used for shaping the stereoregular acrylonitrile polymer of the present invention, solvents known to be applicable to usual acrylonitrile polymers cannot be used because they cannot always dissolve the acrylonitrile polymer of the present invention. The solvent that can be used for an acrylonitrile polymer having a high stereoregularity is limited to a protonic acid or an aqueous solution thereof, an aqueous solution of an inorganic salt, and a mixture of an organic solvent and an inorganic salt. Various definitions or categories, such as proposed by Bronsted or by Lewis, are known for acids. By the term "protonic acid" used herein is meant an acid having ionizable or electrophilic hydrogen. As examples of the protonic acid, there can be mentioned inorganic acids such as nitric acid, sulfuric acid, various phosphoric acids, hydrofluoric acid, hydrochloric acid, hydrobromic acid, hydroiodic acid and perchloric acid, and organic acids such as acetic acid, dichloroacetic acid, trichloroacetic acid, and trifluoroacetic acid. Of course, water, phenols, and alcohols are encompassed by the term "protonic acid". The inventors found that, in a closed volume holding system, water can dissolve the polymer of the present invention at a temperature higher than 180° C., and phenols and alcohols can dissolve the polymer of the present invention at temperatures higher than certain temperatures.

Furthermore, an aqueous solution of an inorganic salt can be used as the solvent or plasticizer for the polymer of the present invention. As preferred examples of the inorganic salt, there can be mentioned rhodanic acid salts such as sodium rhodanide, lithium rhodanide, calcium rhodanide and zinc rhodanide; halogen-containing salts such as zinc chloride and zinc fluoride; and perchlorates such as sodium perchlorate, calcium perchlorate, barium perchlorate and aluminum perchlorate.

Moreover, a mixture of an organic solvent and an inorganic salt can be used. An organic solvent free of an inorganic salt does not dissolve the polymer or swells the polymer and only slightly dissolves the polymer. As the organic solvent, there can be used, for example, dimethylformamide, dimethylsulfoxide, dimethylacetamide, succinonitrile, γ-butyrolactone, an aqueous solution of ethylene carbonate, and hydroxyacetonitrile. As the inorganic salt to be incorporated with the organic solvent, there can be mentioned lithium chloride and lithium fluoride. The present invention is not limited in any way by these solvents and additives.

In the composition comprising the stereoregular polymer and a solvent as described above, the mixing ratio therebetween differs according to the kind of solvent and the method of shaping the composition, but in general, preferably the amounts of the acrylonitrile polymer and the solvent are 5 to 50% by weight and 50 to 95% by weight, respectively, based on the composition.

The stereoregular acrylonitrile polymer of the present invention can be shaped into a fiber, as in case of the conventional acrylonitrile polymer, by preparing a spinning solution by using a solvent as mentioned above, and carrying out the spinning by the dry or wet spinning method. According to a typical instance using an aqueous solution of nitric acid, 10 to 40 parts by weight of the polymer is dissolved in 100 parts by weight of an aqueous solution of nitric acid having a concentration of 60 to 80% by weight to form a spinning solution, and the spinning solution is extruded from a spinneret into a coagulating bath consisting of an aqueous solution having a concentration of 20 to 50% by weight whereby the spinning solution is coagulated to form a fiber. The formed fiber is washed with water, drawn in hot water at 90° C. at a draw ratio of about 10 and dried. The dried fiber can be directly used, but a redrawing treatment or a heat treatment in the swollen or dry state can be carried out according to need.

The fiber prepared from the stereoregular acrylonitrile polymer of the present invention has a superior shapeability, especially drawability. In general, the maximum draw ratio in hot water at 90° C. is usually higher than about 10, and the maximum draw ratio exceeds 11 under some conditions. In contrast, when an acrylonitrile polymer prepared by the conventional γ-ray process is shaped into a fiber even if appropriate conditions are selected, the maximum draw ratio in hot water at 90° C. is about 9 or lower.

Furthermore, the fiber drawn in hot water can be further drawn at a temperature of at least 120° C. in a hot organic medium or on a hot roll in the dry state, whereby the mechanical properties in the wet state of the fiber can be greatly improved. The mechanical properties are generally evaluated based on the Young's modulus in hot water at 95° C. In the case of a usual acrylonitrile fiber, the Young's modulus is not larger than 1 g/d and even in the case of an improved acrylonitrile fiber, the Young's modulus is 3 to 5 g/d. In contrast, in the case of a fiber prepared by using the stereoregular acrylonitrile polymer of the present invention, the Young's modulus is at least 15 g/d.

As described hereinbefore, the stereoregular acrylonitrile polymer of the present invention has a high crystallinity such that the melting point in the presence of water rises, and if the polymer is shaped into a fiber, a product having a high mechanical strength and a superior heat resistance in the wet state can be obtained. Furthermore, the drawability and other shapeabilities in the fiber-forming process are very good.

Moreover, a stereoregular acrylonitrile polymer composition containing a protonic acid or an aqueous solution thereof, an aqueous solution of an inorganic salt, or a mixture of an organic solvent and an inorganic salt as a solvent or a plasticizer is valuable for shaping a fiber or film in which the superior properties of the stereo-regular acrylonitrile polymer are exerted.

The present invention will now be described in detail with reference to the following examples.

EXAMPLE 1

Figure 3:
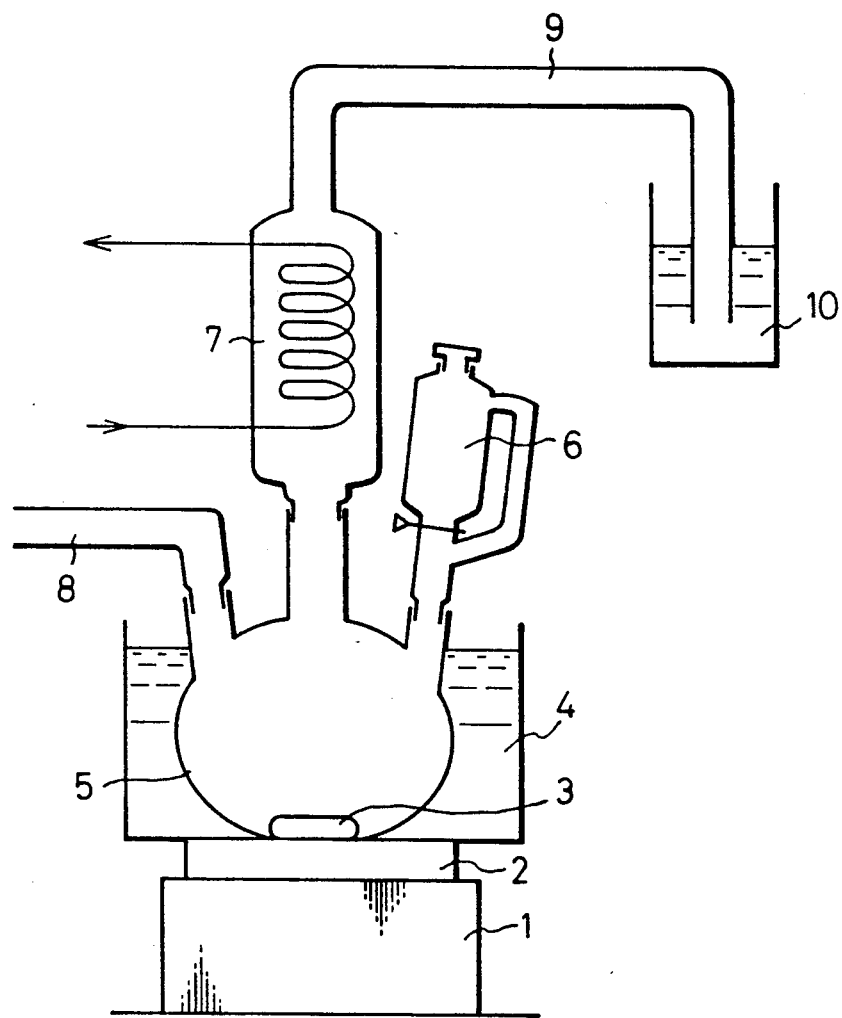

Polymerization was carried out by using an apparatus assembled so that volatile components could be condensed and refluxed, as shown in FIG. 3. First, nitrogen was introduced through a nitrogen supply tube 8 into a three-neck flask 5 having an inner volume of 10,000 ml, to replace air with nitrogen, and 8,000 ml of 1,2,3,5-tetramethylbenzene was charged into the flask in a nitrogen current. Then 120 ml of a solution of 1.0 mole % of di-n-hexylmagnesium as the polymerization initiator in heptane was added, the temperature was adjusted to 130° C., and 1,000 ml of acrylonitrile then dropped into the flask and polymerization conducted for 60 minutes.

An appropriate amount of a hydrochloric acid/methanol liquid mixture was added to the reaction mixture to terminate the polymerization reaction, filtration and water washing were then repeated, and the recovered product was dried to obtain 238 g of a polymer.

This polymer was dissolved at a concentration of 5% by weight in deuterated dimethylsulfoxide and the $^{13}$C-NMR measurement was carried out. It was found that the I, H and S fractions were 0.576, 0.282 and 0.142, respectively. Therefore, (I+3S) was 1.002. The viscosity average molecular weight was 95,000. Note, the viscosity average molecular weight was determined in the following manner. Namely, the sample polymer was dissolved in dimethylsulfoxide at 25° C., and the intrinsic viscosity [η] was determined according to customary procedures. The viscosity average molecular weight M was calculated according to the following equation:

$$[\eta] = 0.204 \times M^{0.58}$$

In an environment maintained at 0° C., 200 g of the obtained polymer was dissolved at a concentration of 16% by weight in an aqueous solution of nitric acid having a concentration of 70% by weight. The obtained composition showed a good stringiness suitable for spinning. This spinning solution was extruded into a coagulating bath consisting of an aqueous solution of nitric acid having a concentration of 34% by weight through a spinneret having 100 spinning orifices each having a diameter of 0.3 mm, and the spinning solution was thus coagulated and washed with water to form an undrawn yarn. Then the maximum draw ratio of the undrawn yarn in hot water at 90° C. was measured, and was found that the maximum draw ratio was 10.5. A drawn yarn obtained by drawing the undrawn yarn in hot water at a draw ratio corresponding to 95% of the maximum draw ratio was drawn at a draw ratio of 2.0 and at a temperature of 135° C. on four dry-heating rolls. The strength of the obtained fiber was 18.2 g/d, and the Young's modulus of the fiber measured in hot water at 95° C. was 17.2 g/d.

EXAMPLE 2

A stereoregular acrylonitrile polymer prepared in the same manner as described in Example 1 except that n-butylethylmagnesium was used as the polymerization initiator was spun into a fiber in the same manner as described in Example 1. When the maximum draw ratio of the obtained undrawn yarn was measured, it was found that the maximum draw ratio was 11.3. The undrawn yarn was drawn at a draw ratio corresponding to 95% of the maximum draw ratio and was then subjected to dry-heat drawing in the same manner as described in Example 1. The strength of the obtained fiber was 14.5 g/d and the Young's modulus measured in hot water at 95° C. was 16.0 g/d.

EXAMPLE 3

A stereoregular acrylonitrile polymer prepared in the same manner as described in Example 1 except that diethylberyllium was used as the polymerization initiator was dissolved in dimethylformamide containing 5% by weight of lithium chloride and the resulting polymer solution was extruded into a coagulating bath consisting of dimethylformamide containing 48% by weight of lithium chloride. The obtained undrawn yarn was washed with water and the maximum draw ratio was measured in the same manner as described in Example 1. It was found that the maximum draw ratio was 10.2. The undrawn yarn was drawn at a draw ratio corresponding to 95% of the maximum draw ratio, and the drawn yarn was subjected to dry-heat drawing in the same manner as described in Example 1. The strength of the obtained fiber was 12.4 g/d and the Young's modulus measured in hot water at 95° C. was 15.4 g/d.

EXAMPLE 4

A stereoregular acrylonitrile polymer prepared in the same manner as described in Example 1 was dissolved in an aqueous solution of sodium rhodinate having a concentration of 50% by weight, and the resulting spinning solution was extruded into a coagulating bath consisting of an aqueous solution of sodium rhodanate having a concentration of 12% by weight. The obtained undrawn yarn was washed with water, and the maximum draw ratio was measured in the same manner as described in Example 1. It was found that the maximum draw ratio was 10.2. The undrawn yarn was drawn at a draw ratio corresponding to 95% of the maximum draw ratio and was then subjected to dry-heat drawing in the same manner as described in Example 1. The strength of the obtained fiber was 12.4 g/d and the Young's modulus measured in hot water at 95° C. was 15.4 g/d.

COMPARATIVE EXAMPLE 1

In a Dewar vessel having an inner volume of 2,000 ml, 56 g of acrylonitrile to which n-butylmercaptan was added in an amount of 2/1,000 mole based on acrylonitrile and urea purified in advance by recrystallization from a methanol/water liquid mixture were charged at a molar ratio of 1/1.5, were mixed, and the vessel was sealed. Ten of such charged and sealed vessels were allowed to stand for 6 days while cooling to −78° C. with dry ice. Then, the mixture was irradiated at −78° C. with 10,000 Ci of γ-rays at an exposure dose of $1.6 \times 10^5$ R/hr for 170 minutes and the reaction product was washed with warm water and methanol to remove urea completely. The total amount of the obtained acrylonitrile polymer was 550 g. The stereoregularity and molecular weight were determined in the same manner as described in Example 1. The I, H and S fractions were 0.553, 0.334, and 0.113, respectively, and therefore, (I+3S) was 0.892. The viscosity average molecular weight was 203,000.

In the same manner as described in Example 1, 200 g of the polymer was dissolved at a concentration of 16% by weight in an aqueous solution of nitric acid having a concentration of 70% by weight and the resulting spinning solution was extruded into a coagulating bath consisting of an aqueous solution of nitric acid having a concentration of 34% by weight by using a spinneret as described in Example 1 to obtain an undrawn yarn. The maximum draw ratio of the undrawn yarn in hot water at 90° C. was 8.1. The undrawn yarn was drawn at a draw ratio corresponding to 95% of the maximum draw ratio and was then subjected to dry-heat drawing in the same manner as described in Example 1. The strength of the obtained fiber was 6.6 g/d and the Young's modulus measured in hot water at 95° C. was 13.7 g/d.

COMPARATIVE EXAMPLE 2

A stereoregular acrylonitrile polymer prepared in the same manner as described in Comparative Example 1 except that n-butylmercaptan was added in an amount of 4/1,000 mole based on acrylonitrile was shaped into a fiber according to the same spinning method as adopted in Example 3. The maximum draw ratio of the undrawn yarn in hot water at 90° C. was 9.5. The undrawn yarn was drawn at a draw ratio corresponding to 95% of the maximum draw ratio and then subjected to dry-heat drawing in the same manner as described in Example 1. The strength of the obtained fiber was 7.8 g/d and the Young's modulus measured in hot water at 95° C. was 14.5 g/d.

COMPARATIVE EXAMPLE 3

A stereoregular acrylonitrile polymer prepared in the same manner as described in Example 1 except that xylene was used as the polymerization solvent and the polymerization temperature was changed to 100° C. was shaped into a fiber by spinning in the same manner as described in Example 1. The viscosity average molecular weight of the polymer was 26,000. When the maximum draw ratio of the undrawn yarn was measured, it was found that the maximum draw ratio was 4.7. The undrawn yarn was drawn at a draw ratio corresponding to 95% of the maximum draw ratio and then subjected to dry-heat drawing in the same manner as described in Example 1. The strength of the obtained fiber was 1.5 g/d and the Young's modulus measured in hot water at 95° C. was 2.9 g/d.

COMPARATIVE EXAMPLE 4

Polymerization was carried out in the same manner as described in Example 1 except that toluene was used as the polymerization solvent, n-butyllithium was used as the polymerization initiator and the polymerization temperature was changed to 0° C. The viscosity average molecular weight of the obtained polymer was 53,000. The polymer was spun into a fiber in the same manner as described in Example 1. The maximum draw ratio of the undrawn yarn was 10.7. The undrawn yarn was drawn at a draw ratio corresponding to 95% of the maximum draw ratio and then subjected to dry-heat drawing in the same manner as described in Example 1. The strength of the obtained fiber was 2.3 g/d and the Young's modulus measured in hot water at 95° C. was 4.8 g/d.

EXAMPLES 5 THROUGH 7

Polymerization and fiber-making were carried out in the same manner as described in Example 1 except that the polymerization initiator, the polymerization solvent, and the polymerization temperature were changed as shown in Table 1.

The results of the foregoing examples and comparative examples are summarized in Table 1. The stereoregular acrylonitrile polymers prepared in all of the examples were those prepared by the catalytic process, and the stereoregular polymers prepared in the comparative examples were those prepared by the γ-ray process or the catalytic process outside the scope of the present invention.

TABLE 1

| | Polymerization catalyst or initiation means | Polymerization solvent | Polymerization temperature (°C.) | Stereoregularity I | H | S | I + 3S |
|---|---|---|---|---|---|---|---|
| Example 1 | DNHM | Tetramethylbenzene | 130 | 0.576 | 0.282 | 0.142 | 1.002 |
| Example 2 | BEM | Tetramethylbenzene | 130 | 0.495 | 0.312 | 0.193 | 1.074 |
| Example 3 | Et$_2$Be | Tetramethylbenzene | 130 | 0.415 | 0.400 | 0.185 | 0.970 |
| Example 4 | DNHM | Tetramethylbenzene | 130 | 0.576 | 0.282 | 0.142 | 1.002 |
| Comparative Example 1 | γ rays | Urea inclusion compound | −78 | 0.553 | 0.334 | 0.113 | 0.892 |
| Comparative Example 2 | γ rays | Urea inclusion compound | −78 | 0.612 | 0.280 | 0.108 | 0.936 |
| Comparative Example 3 | DNHM | Xylene | 100 | 0.502 | 0.330 | 0.168 | 1.006 |
| Comparative Example 4 | BuLi | Toluene | 0 | 0.267 | 0.488 | 0.245 | 1.002 |
| Example 5 | BDAM | Xylene | 120 | 0.583 | 0.267 | 0.150 | 1.033 |
| Example 6 | BMTM | Xylene | 120 | 0.516 | 0.287 | 0.197 | 1.107 |
| Example 7 | TELA | Tetramethylbenzene | 150 | 0.427 | 0.388 | 0.185 | 0.982 |

| | Viscosity average molecular weight | Spinning solvent or plasticizer | Maximum draw ratio in hot water at 95° C. | Strength of dry-heat-drawn yarn (g/d) | Young's modulus in hot water at 90° C. (g/d) |
|---|---|---|---|---|---|
| Example 1 | 95,000 | 70% HNO$_3$ | 10.5 | 18.2 | 17.2 |
| Example 2 | 89,500 | 70% HNO$_3$ | 11.3 | 14.5 | 16.0 |
| Example 3 | 130,300 | DMF + LiCl | 10.2 | 12.4 | 15.4 |
| Example 4 | 95,000 | 50% NaSCN | 10.7 | 13.5 | 16.4 |
| Comparative Example 1 | 203,000 | 70% HNO$_3$ | 8.1 | 6.6 | 13.7 |
| Comparative Example 2 | 106,000 | DMF + LiCl | 9.5 | 7.8 | 14.5 |
| Comparative Example 3 | 26,000 | 70% HNO$_3$ | 4.7 | 1.5 | 2.9 |
| Comparative Example 4 | 53,000 | 70% HNO$_3$ | 10.7 | 2.3 | 4.8 |
| Example 5 | 102,000 | 70% HNO$_3$ | 11.0 | 16.5 | 17.4 |
| Example 6 | 135,200 | 70% HNO$_3$ | 10.8 | 15.9 | 16.5 |
| Example 7 | 57,000 | 70% HNO$_3$ | 10.3 | 13.3 | 19.2 |

Note
DNHM: di-n-hexylmagnesium
BEM: n-butylethylmagnesium
Et$_2$Be: diethylberyllium
BuLi: n-butyllithium
BDAM: bisdiethylaminomagnesium
BMTM: bismethylthio magnesium
TELA: tetraethyllithium aluminum
DMF: dimethylformamide
NaSCN: sodium rhodanide

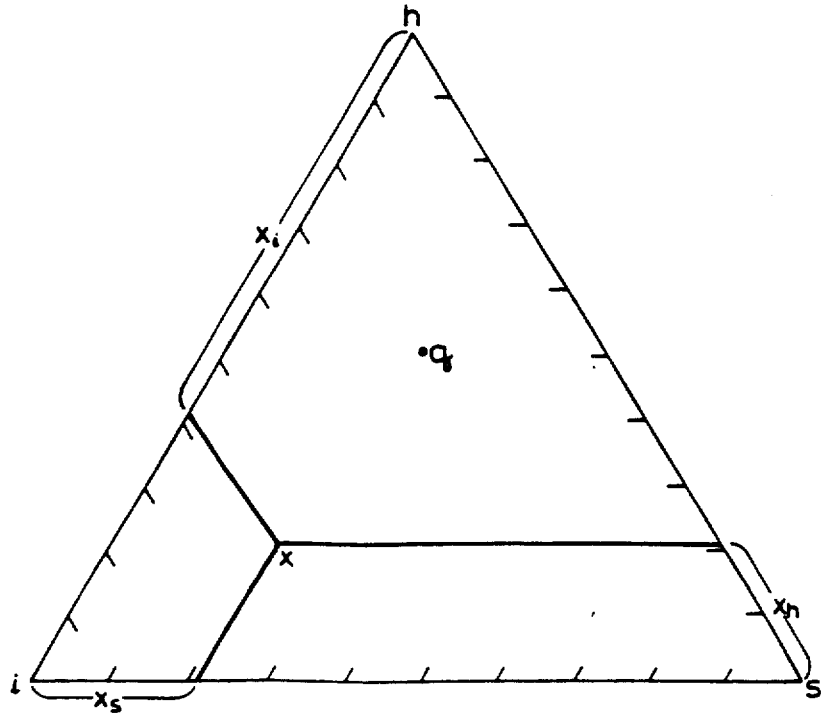

We claim:

1. A linear acrylonitrile polymer having a viscosity average molecular weight of at least 50,000, which has a stereoregularity such that the polymer satisfies requirements of I≧0.4 and (I+3S)≧1, wherein I represents the fraction of the isotactic triad and S represents the fraction of the syndiotactic triad.

2. An acrylonitrile polymer fiber comprised of a linear acrylonitrile polymer having a viscosity average molecular weight of at least 50,000, which has a stereoregularity such that the polymer satisfies requirements of I>0.4 and (I+3S)>1, wherein I represents the fraction of the isotactic triad and S represents the fraction of the syndiotactic triad.

* * * * *

UNITED STATES PATENT AND TRADEMARK OFFICE
CERTIFICATE OF CORRECTION

PATENT NO. : 5,162,476
DATED : November 10, 1992
INVENTOR(S) : Kunio Hisatani, et. al.

It is certified that error appears in the above-indentified patent and that said Letters Patent is hereby corrected as shown below:

The Title page should be deleted to appear as per attached title page.

Sheet 4 of 4 consisting of Fig. 4 should be added as shown on the attached sheet.

Title page, column 2, under item [57] Abstract, change "2 Claims,3 Drawing Sheets" to --2 Claims, 4 Drawing Sheets--.

Claim 1, col. 12, line 56 change "≧" to -->--, both occurrences.

Signed and Sealed this

Nineteenth Day of October, 1993

Attest:

BRUCE LEHMAN

*Attesting Officer*   *Commissioner of Patents and Trademarks*

United States Patent [19]

Hisatani et al.

[11] Patent Number: 5,162,476
[45] Date of Patent: Nov. 10, 1992

[54] STEREOREGULAR ACRYLONITRILE POLYMER AND COMPOSITION COMPRISING SAME

[75] Inventors: Kunio Hisatani, Ikeda; Hitoshi Yamazaki, Ibaraki, both of Japan

[73] Assignee: Asahi Kasei Kogyo Kabushiki Kaisha, Osaka, Japan

[21] Appl. No.: 807,955

[22] Filed: Dec. 10, 1991

Related U.S. Application Data

[63] Continuation of Ser. No. 688,384, Apr. 22, 1991, abandoned, which is a continuation of Ser. No. 517,713, May 2, 1990, abandoned.

[30] Foreign Application Priority Data

May 6, 1989 [JP] Japan ................................. 1-112815

[51] Int. Cl.$^5$ ............................................. C08F 120/44
[52] U.S. Cl. ................................... 526/341; 526/183; 526/177; 526/169.3; 526/123
[58] Field of Search ........................................ 526/341

[56] References Cited

U.S. PATENT DOCUMENTS

| | | | |
|---|---|---|---|
| 3,117,111 | 1/1964 | Natta | 526/341 X |
| 3,231,552 | 1/1966 | Natta | 526/341 X |
| 3,246,772 | 3/1966 | Natta | 526/341 X |

FOREIGN PATENT DOCUMENTS 63-304029 12/1988 Japan.
1-203406 8/1989 Japan.

OTHER PUBLICATIONS

M. Minagawa et al., (1989) Macromolecules 22, 2054–2058.
M. Minagawa et al., (1988) Macromolecules 21, 2387–2391.
Chem. Abstracts 110: 214678r.
Chem. Abstracts 112: 140098u.

Primary Examiner—Joseph L. Schofer
Assistant Examiner—M. Nagumo
Attorney, Agent, or Firm—Finnegan, Henderson, Farabow, Garrett, Dunner

[57] ABSTRACT

Disclosed is a linear acrylonitrile polymer having a viscosity average molecular weight of at least 50,000, which has a stereoregularity such that the polymer satisfies requirements of $I>0.4$ and $(I+3S)>0.95$, wherein I represents the fraction of the isotactic triad and S represents the fraction of the syndiotactic triad. A shaped article is made from a composition comprised of the linear acrylonitrile polymer and a solvent or plasticizer which is selected from a protonic acid and an aqueous solution thereof, an aqueous inorganic salt solution, and a mixture of an organic solvent and an inorganic salt. The fiber made therefrom has an enhanced drawability.

2 Claims, 4 Drawing Sheets